May 19, 1931.   J. VOLKMANN   1,805,934
PROTECTIVE DEVICE FOR ALTERNATING POLYPHASE SYSTEMS OF DISTRIBUTION
Filed Sept. 18, 1925
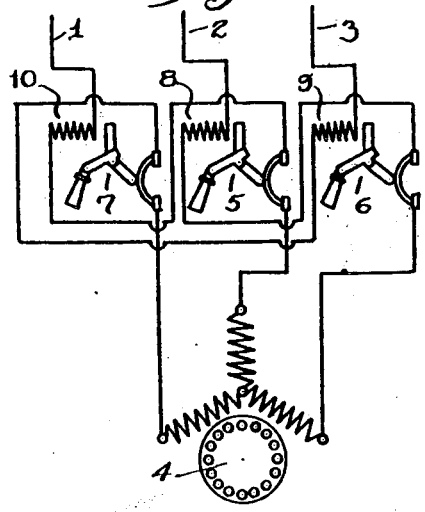
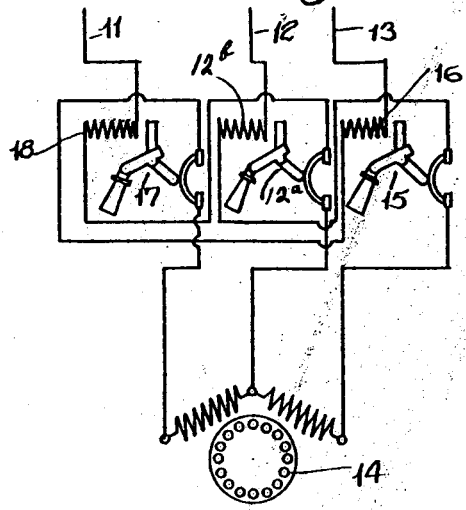
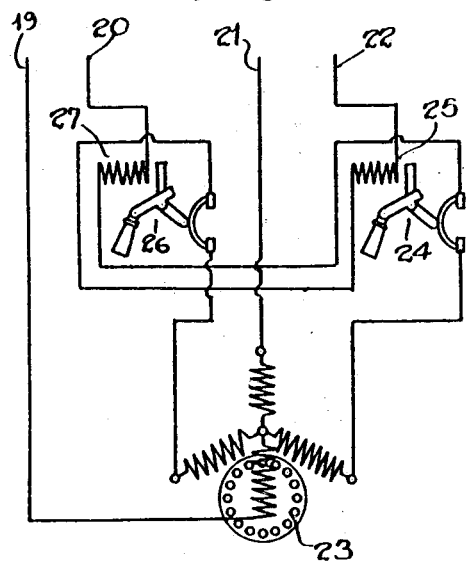
INVENTOR.
J. Volkmann.
BY
ATTORNEY.

Patented May 19, 1931

1,805,934

UNITED STATES PATENT OFFICE

JOSEPH VOLKMANN, OF GLENSIDE, PENNSYLVANIA

PROTECTIVE DEVICE FOR ALTERNATING POLYPHASE SYSTEMS OF DISTRIBUTION

Application filed September 18, 1925. Serial No. 57,249.

This invention relates to protective devices for alternating polyphase systems of distribution.

The primary object of this invention is to provide a novel arrangement of circuit controlling devices in such a system, the arrangement being such that abnormal decrease or interruption of current flow in one phase of such a system will effect interruption of the current flow in the other phases of the system.

A second important object of the invention is to provide a novel arrangement of under load circuit breakers for such a system, each controlling one of the line wires and being in turn controlled by current flow through another line wire.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a diagram showing the invention applied to a three phase three wire system feeding a polyphase motor.

Figure 2 is a diagram showing the invention applied to a two phase three wire system feeding a polyphase motor.

Figure 3 is a diagram showing the invention applied to a two phase four wire system feeding a polyphase motor.

In the form shown in Figure 1 there is disclosed the line wires 1, 2, and 3 of a three phase three wire system, these wires leading to the polyphase motor 4. In each of these line wires is interposed an underload circuit breaker as shown at 5, 6, and 7 respectively and it will be noted that the solenoid 8 of the circuit breaker 5 is in series with the circuit breaker 6, having its solenoid 9 in series with circuit breaker 7 which in turn has its solenoid 10 in series with circuit breaker 5.

Under these conditions an abnormal decrease in any one line will successively open the other lines. For instance, if there occur an abnormal decrease in line 2, circuit breaker 5 will open. This will de-energize solenoid 10 and circuit breaker 7 will open which will de-energize solenoid 9 so that circuit breaker 6 will open.

In Figure 2 is shown a three wire two phase system wherein 11 and 13 are the phase wires while 12 is the neutral. Underload circuit breakers 15 and 17 are employed having coils 16 and 18 and control the phase lines 11 and 13, the breaker for line 11 having its solenoid in series with the breaker for line 12 and the breaker for line 13 has its solenoid in series with the breaker for line 11. The neutral wire 12 is also provided with a circuit breaker 12a which has its solenoid in series with the breaker for line 13. These breakers control the current to the motor 14 as in the previous case.

In the form shown in Figure 3 wires 19 and 21 are return lines while wires 20 and 22 are phase lines. Each phase line has an underload circuit breaker 24 and 26 having respective solenoids 25 and 27 controlled from the opposite phase line as in Figure 2 and these circuit breakers control the flow of current to the motor 23 as before explained.

In all the cases mentioned an abnormal condition in any phase line causes complete opening of all the phase lines.

There has thus been provided a simple and efficient device of the kind described and for the purpose specified.

It is obvious that minor changes may be in the form and construction of the invention without departing from the material spirit thereof. It is not, therefore, desired to confine the invention to the exact form herein shown and described, but it is desired to include all such as properly come within the scope claimed.

I claim:

1. In a multiphase electrical distribution system, a plurality of phase lines leading to a motor, a circuit maker and breaker in each phase line and an electro magnet in each phase line, the electro magnet of each phase line being operatively associated with the circuit maker and breaker of the other phase lines, whereby the latter will be opened seriative, when the current in one line is so reduced as to overload the other lines.

2. The combination with a polyphase power supply line and a translating device, of a magnet winding for, and having one end connected to, each phase conductor, the opposite end of each winding being connected to one terminal of said translating device, an armature for each winding, a conductor bar associated with each armature, the connection from each winding to said translating device being through the conductor bar of another winding and means to open the circuit between a phase conductor and the corresponding terminal of the translating device upon the failure of current flow through the winding associated with the conductor bar in that circuit.

3. The combination with a polyphase power supply line and a polyphase translating device of a phase conductor leading from each power wire to a terminal of said device, a magnet winding interposed in each phase conductor, means in each phase conductor to normally open its circuit, each circuit opening means being associated with the magnet winding in another phase conductor whereby it is adapted to close its circuit when the associated magnet is energized by a current flow in the phase conductor of the magnet.

In testimony whereof I affix my signature.

JOSEPH VOLKMANN.